United States Patent
Wei

(10) Patent No.: US 11,619,274 B2
(45) Date of Patent: Apr. 4, 2023

(54) DUAL BRAKE SLACK ADJUSTER AND SYSTEMS, COMPONENTS, AND METHODS THEREOF

(71) Applicant: Caterpillar Inc., Peoria, IL (US)

(72) Inventor: Puning Wei, Naperville, IL (US)

(73) Assignee: Caterpillar Inc., Peoria, IL (US)

( * ) Notice: Subject to any disclaimer, the term of this patent is extended or adjusted under 35 U.S.C. 154(b) by 122 days.

(21) Appl. No.: 17/122,190

(22) Filed: Dec. 15, 2020

(65) Prior Publication Data
US 2022/0186802 A1 Jun. 16, 2022

(51) Int. Cl.
*F16D 65/74* (2006.01)
*F16D 121/04* (2012.01)
*F16D 125/06* (2012.01)

(52) U.S. Cl.
CPC .......... *F16D 65/74* (2013.01); *F16D 2121/04* (2013.01); *F16D 2125/06* (2013.01)

(58) Field of Classification Search
CPC .......... F16D 65/72; F16D 65/74; F16D 65/76; F16D 65/22; F16D 2121/04; F16D 2125/06
See application file for complete search history.

(56) References Cited

U.S. PATENT DOCUMENTS

| | | | |
|---|---|---|---|
| 2,055,182 A * | 9/1936 | Schultz | F16D 65/22 188/196 A |
| 2,638,750 A * | 5/1953 | Hettinger, Jr. | F16H 63/3003 192/111.11 |
| 2,662,617 A * | 12/1953 | Mougin | F16D 65/22 60/590 |
| 3,011,315 A * | 12/1961 | Menichello | F16D 65/74 92/75 |
| 3,312,062 A | 4/1967 | Macduff | |
| 3,431,730 A * | 3/1969 | Bueler | F16D 65/74 60/590 |
| 3,977,731 A * | 8/1976 | Kasahara | B60T 8/26 200/82 D |
| 4,024,712 A | 5/1977 | Takeuchi | |

(Continued)

FOREIGN PATENT DOCUMENTS

| | | |
|---|---|---|
| FR | 1560358 A | 3/1969 |
| GB | 673245 A * | 3/1968 |

OTHER PUBLICATIONS

Written Opinion and International Search Report for Int'l. Patent Appln. No. PCT/US2021/058555, dated Feb. 22, 2022 (11 pgs).

*Primary Examiner* — Vishal R Sahni
(74) *Attorney, Agent, or Firm* — Xsensus, LLP

(57) ABSTRACT

A slack adjuster and systems, components, and methods can comprise a base enclosure, a pair of floating piston assemblies, and a pair of sensing piston assemblies. The base enclosure can define an internal chamber that extends along a longitudinal axis of the base enclosure and an inlet channel that extends along a transverse axis of the base enclosure perpendicular to the longitudinal axis. The internal chamber can have a first chamber portion, a second chamber portion, and a center chamber portion that intersects the inlet channel. The floating piston assemblies can be respectively provided in the first and second chamber portions. Likewise, the sensing piston assemblies can be respectively provided in association with the floating piston assemblies.

20 Claims, 4 Drawing Sheets

(56) References Cited

U.S. PATENT DOCUMENTS

| | | | |
|---|---|---|---|
| 4,313,642 A | | 2/1982 | Berisch |
| 4,338,787 A | | 7/1982 | Kawaguchi |
| 4,471,614 A | * | 9/1984 | Hart ..................... B60T 13/44 60/591 |
| 4,755,008 A | | 7/1988 | Imoto et al. |
| 5,497,859 A | * | 3/1996 | Nowosielski ........... F16D 65/22 188/79.62 |
| 5,685,399 A | * | 11/1997 | Butler .................... B60T 13/22 188/196 A |
| 2016/0229430 A1 | * | 8/2016 | Whalen .................. F16D 65/66 |
| 2016/0281807 A1 | | 9/2016 | Kaufman et al. |

\* cited by examiner

DUAL BRAKE SLACK ADJUSTER AND SYSTEMS, COMPONENTS, AND METHODS THEREOF

TECHNICAL FIELD

The present disclosure relates to slack adjusters for mechanical brake systems, and more particularly to dual brake slack adjusters and systems, components, and methods thereof.

BACKGROUND

In some cases a length of a dual brake slack adjuster may be increased to accommodate increased sensing piston volume. However, the increase in length may have affect interfacing considerations for tube assemblies that interface with the dual brake slack adjuster. For instance, it may be desirable or even necessary to redesign and rebuild tube assemblies in light of the increased length of the dual brake slack adjuster. This can adversely affect timing and costs pertaining to future component management, manufacturing, service, and inventory loss.

U.S. Pat. No. 5,685,399 ("the '399 patent") describes a hydraulic brake slack adjuster. The '399 patent describes that the hydraulic brake slack adjuster can be disposed between a brake valve and an actuator of a brake mechanism and can have a first piston exposed to pressurized brake fluid from the valve end and a second larger piston connected to the first piston for outputting brake fluid to the brake actuator with the fluid output to the actuator being greater than the volume of the input fluid from the valve. According to the '399 patent, this permits a smaller pump to be used while maintaining sufficient brake operation speed.

SUMMARY

According to an aspect a slack adjuster is disclosed or implemented. The slack adjuster can comprise: a base enclosure defining an internal chamber that extends along a longitudinal axis of the base enclosure and an inlet channel that extends along a transverse axis of the base enclosure perpendicular to the longitudinal axis, the internal chamber having a first chamber portion, a second chamber portion, and a center chamber portion that intersects the inlet channel and is in fluid communication with the first and second chamber portions of the internal chamber; a pair of floating piston assemblies respectively provided in the first and second chamber portions; and a pair of sensing piston assemblies respectively interfacing with the pair of floating piston assemblies in the first and second chamber portions. The first and second chamber portions can be sized in a direction of the longitudinal axis to respectively accommodate an entirety of the sensing piston assemblies without the sensing piston assemblies extending from the first and second chamber portions at least in a first position of each set of floating piston and sensing piston assemblies.

In another aspect, a method is disclosed or implemented. The method can comprise: providing a dual slack adjuster assembly having an inlet port to receive brake fluid, a first outlet port to selectively pass the brake fluid, and a second outlet port to selectively pass the brake fluid; and providing the brake fluid within the dual slack adjuster assembly. The dual slack adjuster assembly can include: a base enclosure defining an internal chamber that extends along a longitudinal axis of the base enclosure and an inlet channel that extends from the inlet port along a transverse axis of the base enclosure perpendicular to the longitudinal axis, the internal chamber having a first chamber portion, a second chamber portion, and a center chamber portion that intersects the inlet channel and is in fluid communication with the first and second chamber portions, a pair of floating piston assemblies respectively slidingly provided in the first and second chamber portions, and a pair of sensing piston assemblies respectively supported on the floating piston assemblies. The providing of the brake fluid to the dual slack adjuster assembly can cause each set of floating piston and sensing piston assemblies to respectively slide within the first and second chamber portions to one of a first position and a second position. In the first position each of the sensing piston assemblies can be entirely outside of the center chamber portion of the internal chamber.

And in another aspect a multi-wheel braking system for a vehicle is disclosed or provided. The system can comprise: a hydraulic fluid source adapted to control supply of hydraulic fluid responsive to a braking input; and a dual slack adjuster having an inlet port to receive the hydraulic fluid from the hydraulic fluid source, a first outlet port to selectively pass the hydraulic fluid to control braking of a first wheel of the vehicle, and a second outlet port to selectively pass the hydraulic fluid to control braking of a second wheel of the vehicle. The dual slack adjuster can include: a base enclosure defining an internal chamber that extends along a longitudinal axis of the base enclosure, an inlet channel that extends from the inlet port along a transverse axis of the base enclosure perpendicular to the longitudinal axis, at least one first backflow channel that extends from the inlet channel in a first direction of the longitudinal axis, and at least one second backflow channel that extends from the inlet channel in a second direction of the longitudinal axis opposite the first direction, a first sensing piston assembly associated with the first outlet port and a second sensing piston assembly associated with the second outlet port, and a first floating piston assembly associated with the first outlet port and a second floating piston assembly associated with the second outlet port. The internal chamber can include a first chamber portion associated with the first outlet port, a second chamber portion associated with the second outlet port, and a center chamber portion that intersects the inlet channel and intervenes between the first and second chamber portions. The first chamber portion can accommodate the first floating piston assembly and the second chamber portion can accommodate the second floating piston assembly such that each of the first and second floating piston assemblies is movable to each of a first position and a second position within the first and second chamber portions, respectively. In the first position of the first floating piston assembly the first sensing piston assembly can be entirely in the first chamber portion and in the second position of the first floating piston assembly the first sensing piston assembly can be partly in the center chamber portion. Also, in the first position of the second floating piston assembly the second sensing piston assembly can be entirely in the second chamber portion and in the second position of the second floating piston assembly the second sensing piston assembly can be partly in the center chamber portion. Each of the at least one first backflow channel and each of the at least one second backflow channel can remain in a same position when the first and second floating piston assemblies are respectively in each of the first and second positions.

Other features and aspects of this disclosure will be apparent from the following description and the accompanying drawings.

DETAILED DESCRIPTION

The present disclosure relates to slack adjusters for mechanical braking systems, and more particularly to dual brake slack adjusters and systems, components, and methods thereof.

Figure 1:
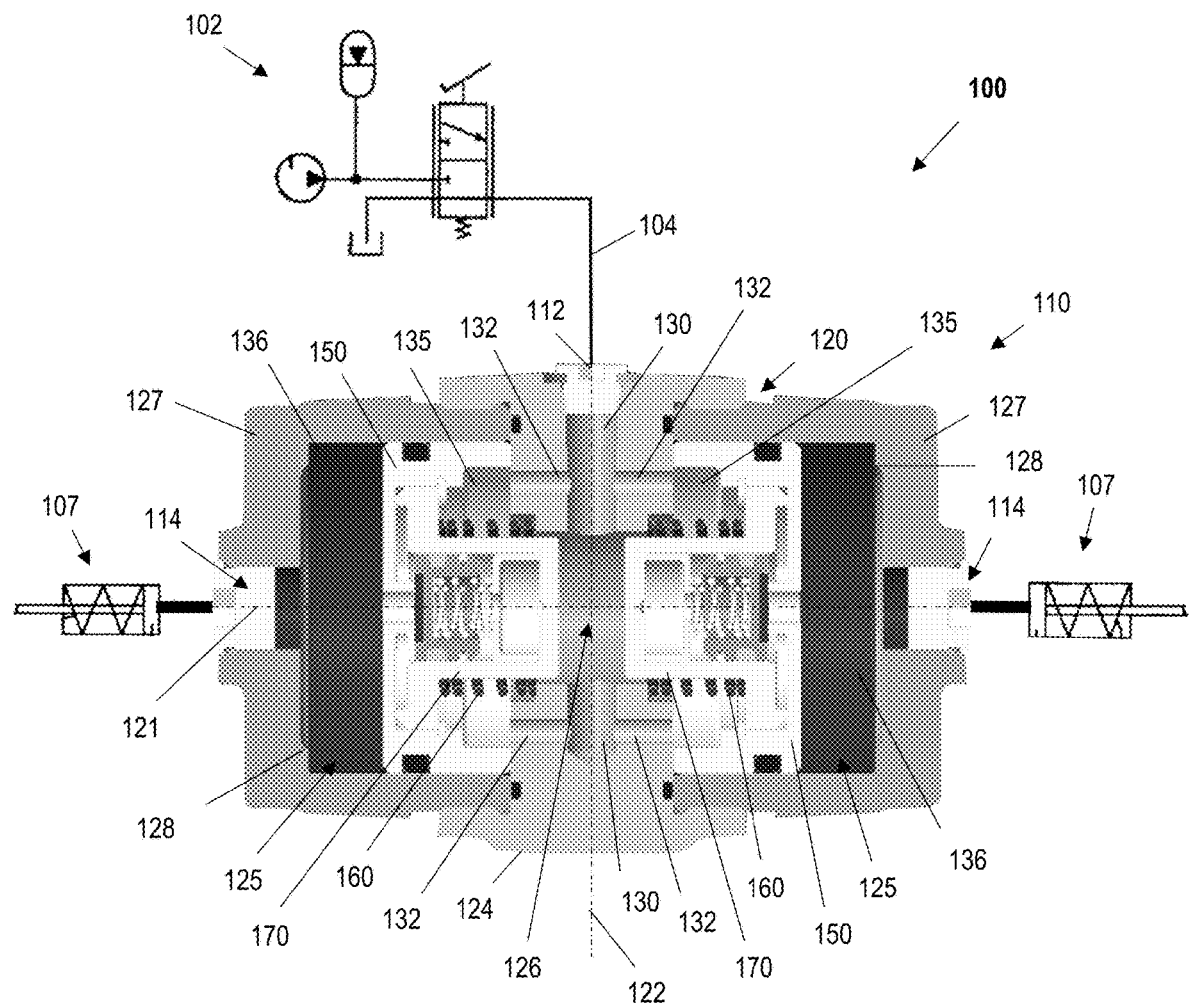
FIG. 1 shows a braking system according to one or more embodiments of the disclosed subject matter.

Referring to FIG. 1, a braking system 100 of a vehicle according to embodiments of the disclosed subject matter can have a slack adjuster 110. The braking system 100 can also have a brake fluid source 102 to provide brake fluid, also known as hydraulic fluid, to the slack adjuster 110, and a pair of brake assemblies 107 to process brake fluid relative to the slack adjuster 110. The brake assemblies 107 may be referred to herein as a first brake assembly 107 and a second brake assembly 107.

Generally, the brake fluid source 102 may include a pump, an accumulator, and a brake valve or the like to selectively provide brake fluid (from a reservoir) to the slack adjuster 110 via a brake line 104. The brake fluid can be pressurized and provided responsive to a braking input (e.g., depression or not of a brake pedal of the vehicle).

FIG. 1 represents each of the brake assemblies 107 in the form of a hydraulically actuated spring release brake having an actuator, though brake assemblies 107 according to embodiments of the disclosed subject matter are not limited by the specific representation shown in FIG. 1. The brake assemblies 107 can be disk- or drum-based braking assemblies to control braking of respective wheels of the vehicle.

In general, the braking control of the brake assemblies 107 can be based on the input and output and flow direction of the brake fluid relative to the slack adjuster 110. In this regard, the slack adjuster 110 can selectively pass (i.e., output or not) the brake fluid to the brake assemblies 107 to control braking operation of the brake assemblies 107. Likewise, the slack adjuster 110 can receive brake fluid from the brake assemblies 107. This may be referred to as backflow and may occur upon a decrease in braking command (including releasing the brakes entirely). In general, the amount (including pressure) of the pressurized brake fluid provided to the brake assemblies 107 from the slack adjuster 110 can be the same or substantially the same. This can prevent or minimize pulling to one side or the other due to unevenly supplied brake fluid.

The slack adjuster 110 can have an inlet port 112 and a pair of outlet ports 114. The pair of outlet ports 114 may be referred to herein as a first outlet port 114 and a second outlet port 114. The inlet port 112 can receive brake fluid from the brake line 104 and the outlet ports 114 can pass brake fluid to and from the brake assemblies 107. In that brake fluid may be intermittently output from the outlet ports 114 or in that the flow direction of the brake fluid may change, the processing of the brake fluid at the outlet ports 114 can be characterized as selective.

The slack adjuster 110 can include a base enclosure 120. The base enclosure 120 can define or otherwise include the inlet port 112 and the outlet ports 114. According to one or more embodiments, the base enclosure 120 can be comprised of a central base 124 and a pair of end caps 127. The end caps 127 may be referred to herein as a first end cap 127 and a second end cap 127. As shown in FIG. 1, each end cap 127 can have or otherwise define a corresponding one of the outlet ports 114 and the central base 124 can have or otherwise define the inlet port 112. Optionally, central base 124 can threadedly receive the end caps 127 at opposite ends thereof. That is, the end caps 127 can be coupled to the central base 124 via threading. Such coupling may form a seal to prevent brake fluid from exiting the slack adjuster 110 via these interfaces.

The base enclosure 120 can also define or otherwise include an internal chamber that extends along a longitudinal axis 121 of the base enclosure 120 and an inlet channel 130 that extends along a transverse axis 122 of the base enclosure 120 perpendicular to the longitudinal axis 121. Optionally, the longitudinal axis 121 and the transverse axis 122 can be considered or characterized as being longitudinal and transverse axes of the slack adjuster 110 (rather than just the base enclosure 120). As shown in FIG. 1, the inlet channel 130 can extend from the inlet port 112. The inlet channel 130 can be defined or otherwise be provided in the central base 124 according to one or more embodiments of the disclosed subject matter.

The internal chamber may have or otherwise be characterized as having a pair of chamber portions 125 and a center chamber portion 126. The chamber portions 125 may be referred to herein as a first chamber portion 125 and a second chamber portion 125. The first chamber portion 125 may be associated with one of the outlet ports 114 and the second chamber portion 125 may be associated with the other of the outlet ports 114. Additionally, discussed in more detail below, each chamber portion 125 may have or otherwise define an inlet chamber 135 and an outlet chamber 136.

The center chamber portion 126, which can be formed in the center base 124, can be between the first and second chamber portions 125 and can be in fluid communication with the first and second chamber portions 125, at least in some states of operation of the slack adjuster 110. According to one or more embodiments, the center chamber portion 126 can be considered a bore in the center base 124 and may be cylindrical in shape (circular in cross-section). The center chamber portion 126, which can extend in a direction of the longitudinal axis 121, can intersect the inlet channel 130, which can extend in a direction of the transverse axis 122. In this regard, optionally, portions of the inlet channel 130 can extend from opposite sides of the center chamber portion 126, such as shown in FIG. 1.

According to one or more embodiments, the base enclosure 120 can include one or more channels 132 that extend from the inlet channel 130 away from the transverse axis 122. For instance, the channels 132 may extend in the direction of the longitudinal axis 121 away from the transverse axis 122. As shown in FIG. 1, the central base 124 can define or otherwise have the channels 132. According to one or more embodiments, each of the channels 132 can extend from the inlet channel 130 to their respective chamber portions 125 without going through the center chamber portion 126. More specifically, each of the channels 132 can be in fluid communication with the respective inlet chambers 135 of the corresponding chamber portion 125.

One or more channels 132 that extend toward one of the end caps 127 can be referred to herein as first channels 132 and one or more channels 132 that extend toward the other of the end caps 127 can be referred to herein as second channels 132. Additionally, a plurality of channels 132 may be provided on a first side of the longitudinal axis 121 closest to the inlet port 112 and/or a plurality of channels 132 may be provided on a second side of the longitudinal axis 121 farthest from the inlet port 112, such as shown in FIG. 1. Discussed in more detail below, in one or more states of operation of the slack adjuster 110, brake fluid may be caused to flow from the inlet chambers 135 of the chamber portions 125 to the inlet channel 130, where such flow may be referred to as backflow. Hence, the channels 132 may be referred to as backflow channels 132 (or first backflow channel(s) 132 and second backflow channel(s) 132).

The slack adjuster 110 can include a pair of floating piston assemblies 150 and a pair of sensing piston assemblies 170. One of the floating piston assemblies 150 and one of the sensing piston assemblies 170 can be associated with one of the outlet ports 114 and the other of the floating piston assemblies 150 and the other of the sensing piston assemblies 170 can be associated with the other of the outlet ports 114. An associated floating piston assembly 150 and sensing piston assembly 170 may be referred to as a set of floating piston and sensing piston assemblies. Hence, the slack adjuster 110 can have two sets of floating piston and sensing piston assemblies.

As shown in FIG. 1, each channel 132 can extend from the inlet channel 130 to their respective chamber portions 125 without intersecting or passing through the sensing piston assembly 170 associated with that chamber portion 125. The portion(s) of the chamber portion 125 between the floating piston assembly 150 and the center base 124 can correspond to inlet chamber 135 and the portion(s) between the floating piston assembly 150 and the outlet port 114 can correspond to the outlet chamber 136.

The floating piston assemblies 150 can be provided in respective ones of the first and second chamber portions 125. The floating piston assemblies 150 can be accommodated in the first and second chamber portions 125 so as to be movable from a first position to a second position and vice versa. More specifically, the floating piston assemblies 150 can be slidingly provided in the first and second chamber portions 125. Hence, the floating piston assemblies 150 can be caused to slide from the first position to the second position and vice versa. The first and second positions may be referred to as or indicative of different operational states of the slack adjuster 110. FIG. 1 shows both floating piston assemblies 150 in a second position according to one or more embodiments of the disclosed subject matter. Incidentally, the channels 132 may not move when the floating piston assembly 150 moves from the first position to the second position or vice versa. That is, the channels 132 can be stationary.

Optionally, no portion of the floating piston assemblies 150 may be provided in the center chamber portion 126 when the floating piston assemblies 150 are in the second position, such as shown in FIG. 1. Indeed, no portion of the floating piston assemblies 150 may extend into the center chamber portion 126 in either the first position or the second position and positions between the first and second positions.

The sensing piston assemblies 170 can be provided in respective ones of the first and second chamber portions 125, at least partially. For instance, as shown in FIG. 1, in the second position of the floating piston assemblies 150 the sensing piston assemblies 170 can be partially in the chamber portions 125 and partially in the center chamber portion 126. That is, a portion of the sensing piston assembly 170 can extend into the center chamber portion 126 when the floating piston assembly 150 is in the second position. Discussed in more detail below, the sensing piston assemblies 170 may be entirely outside of the center chamber portion 126 at least in the first position of the floating piston assemblies 150. That is, the chamber portion 125 can be sized in the direction of the longitudinal axis 121 to accommodate all of the sensing piston assembly 170 such that the sensing piston assembly 170 does not extend from the chamber portion 125 in the direction of the longitudinal axis 121 at least in the first position of the floating piston assembly 150.

Each sensing piston assembly 170 can be associated with a corresponding floating piston assembly 150, as noted above. For instance, the sensing piston assembly 170 may be provided on or otherwise interface with the floating piston assembly 150. According to one or more embodiments, the sensing piston assembly 170 can be supported by the floating piston assembly 150 such that the two can move in unison, for instance, from the first position to the second position of the floating piston assembly 150 and vice versa within the internal cavity. For example, the sensing piston assembly 170 and the floating piston assembly 150 can be fixed to each other using a snap ring.

Optionally, as shown in FIG. 1, the floating piston assembly 150 can extend in the direction of the longitudinal axis 121 to more than half the amount of the length of a piston or cage of the sensing piston assembly 170. That is, though the piston or cage of the sensing piston assembly 170 may project from the floating piston assembly 150, the amount by which the piston or cage of the sensing piston assembly 170 projects from the floating piston assembly 150 may be less than the amount of the piston or cage of the sensing piston assembly 170 that does not project from the floating piston assembly 150 in the direction of the longitudinal axis 121.

According to one or more embodiments, a pair of springs 160 can be provided to bias the respective sets floating piston assembly 150 and sensing piston assembly 170 away from the transverse axis 122 (and toward the respective outlet ports 114). The pair of springs 160 may be referred to herein as a first spring 160 and a second spring 160.

The spring 160, which may be provided around a portion of the sensing piston assembly 170 (e.g., a cage or piston portion) may abut the center base 124, such as shown in FIG. 1, and, furthermore, can act directly on the sensing piston assembly 170. Optionally, the spring 160 may be considered part of the sensing piston assembly 170. In that the floating piston assembly 150 and the sensing piston assembly 170 can move in unison, the spring 160, acting directly on the sensing piston assembly 170, can thus also bias the associated floating piston assembly 150.

INDUSTRIAL APPLICABILITY

As noted above, the present disclosure relates to slack adjusters for mechanical brake systems, and more particularly to dual brake slack adjusters and systems, components, and methods thereof.

Slack adjusters according to embodiments of the disclosed subject matter, such as slack adjuster 110, in general, can utilize a differential piston principle to provide larger output flow to the brake assemblies, such as brake assemblies 107, relative to the input flow of brake fluid from a brake fluid source, such as brake fluid source 102. Moreover, slack adjusters according to embodiments of the disclosed subject matter can be used to maintain a minimum clearance between stationary and rotating elements of the brake assembly 107.

For instance, slack adjusters according to embodiments of the disclosed subject matter can maintain sufficient brake operation speed via compensation of the brake disk worn through time by controlling the disk running clearance using the volume of brake fluid in the outlet chamber 136. That is, as the brake disk wears the volume of brake fluid in the chamber of the brake assembly 107 can increase to compensate for the wear and keep the disk running clearance close to non-wear condition. The additional volume of brake fluid can come from the slack adjuster 110 and will be trapped in the chamber of the brake assembly 107 when a fluid replenishing valve 176 is closed and the floating piston assembly 150 (and the sensing piston assembly 170) is in the first position.

Figure 2:
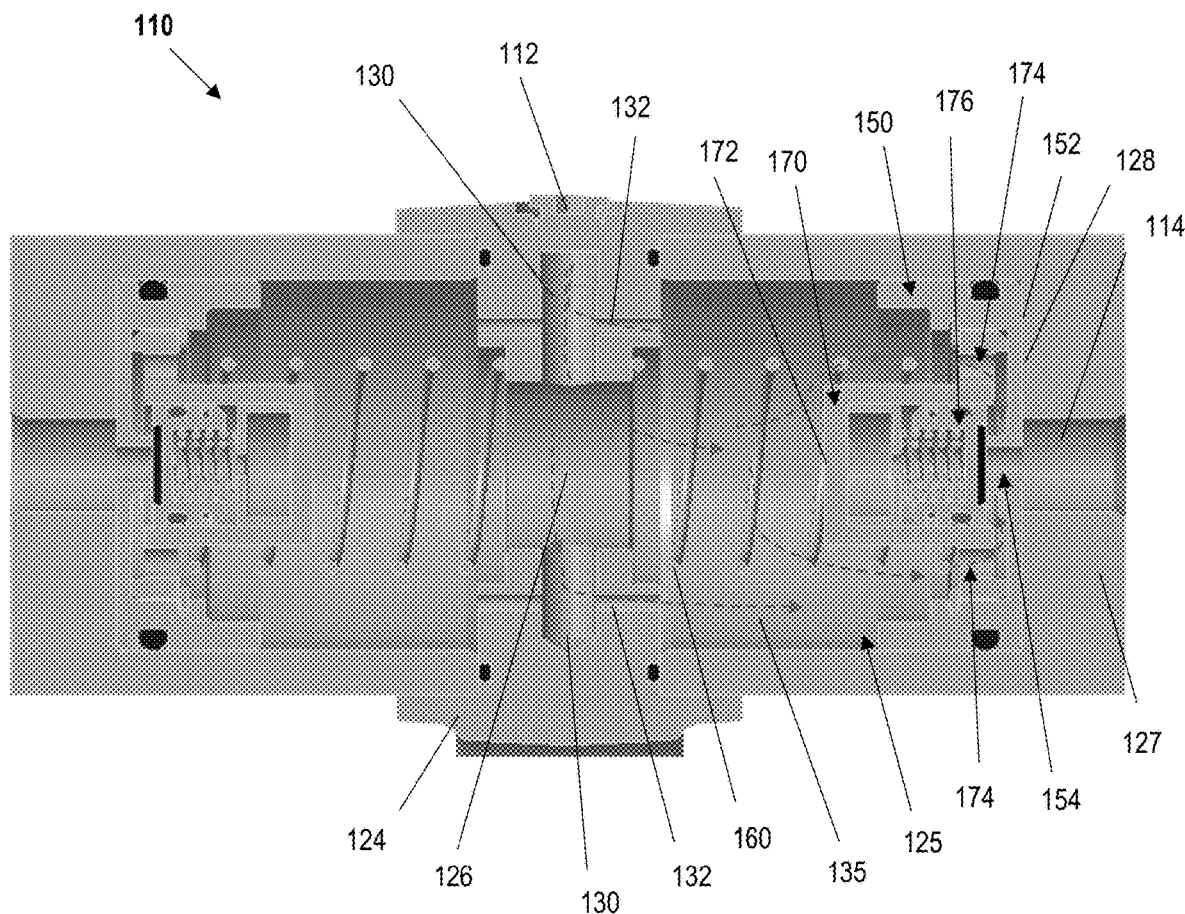
FIG. 2 is a sectional view of a slack adjuster according to one or more embodiments of the disclosed subject matter.
Figure 3:
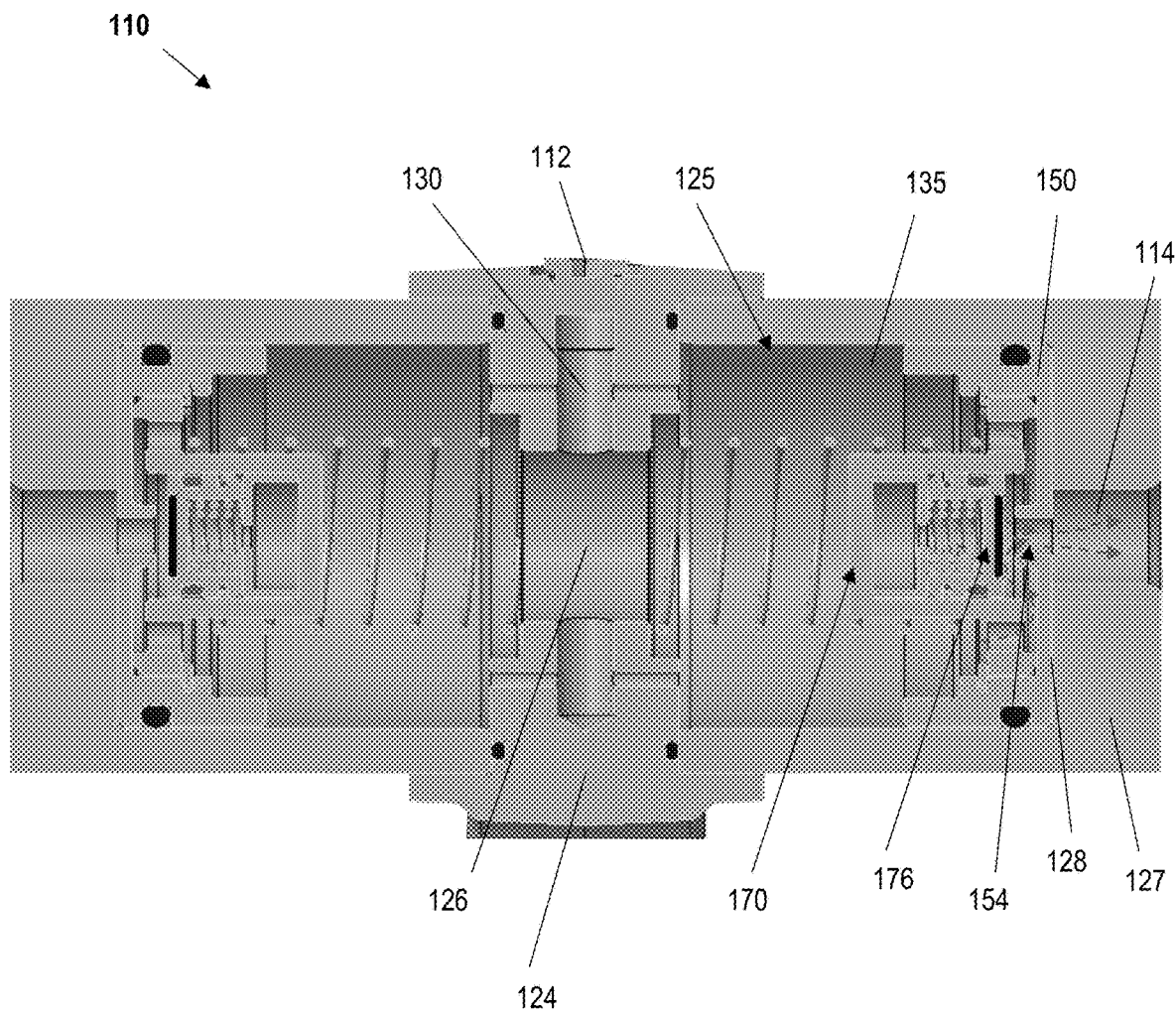
FIG. 3 is a sectional view of the slack adjuster of FIG. 2 in an operational state different from the one shown in FIG. 2.
Figure 4:
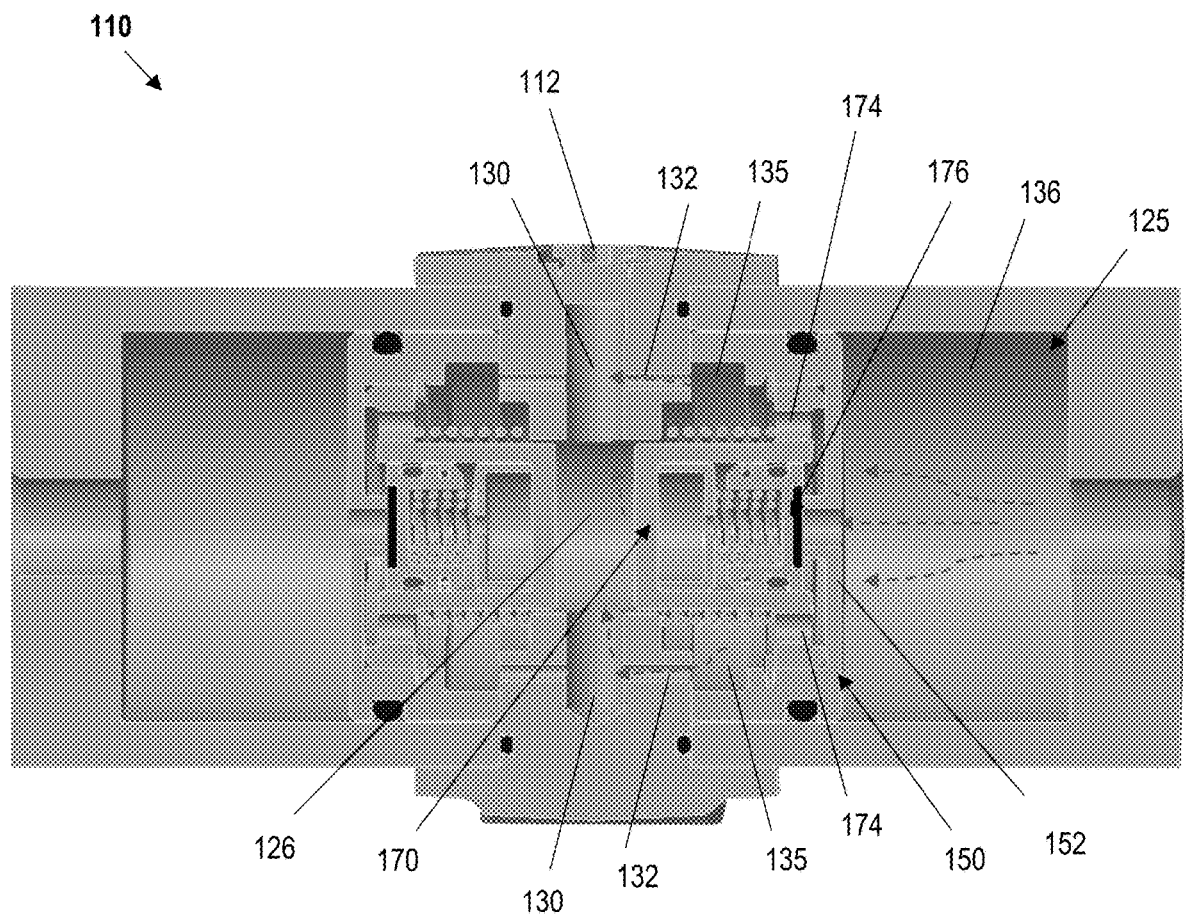
FIG. 4 is a sectional view of the slack adjuster of FIG. 2 in an operational state different from the ones shown in FIG. 2 and FIG. 3.

Referring now to FIGS. 2-4, these figures are provided to describe operation of the slack adjuster 110 according to various operations (modes or states) according to embodiments of the disclosed subject matter. Operation of only one side of the slack adjuster 110 is described since operation of the other side of the slack adjuster 110 can be the same. The table below shows operation of the slack adjuster 110 according to various operations.

into the inlet chamber 135 of the chamber portion 125. The one or more channels 132 can supplement the flow volume provided by the center chamber portion 126 to move the floating piston assembly 150 (and the sensing piston assembly 170) to the first position. As shown in FIG. 2, in the first position, the floating piston assembly 150 can abut an end wall 128 of the end cap 127. The sensing piston assembly 170 can also be entirely outside of the center chamber portion 126. Movement to the position shown in FIG. 2 can push brake fluid between the floating piston assembly 150 and the outlet port 114, i.e., in the outlet chamber 136, to the braking assembly 107.

As shown in FIG. 2, brake fluid can flow through the sensing piston assembly 170 via one or more passageways 174. Such flow can be directly from the inlet chamber 135 of the chamber portion 125 through the one or more passageways 174. However, the brake fluid may be prevented from proceeding to a passageway 154 of the floating piston assembly 150 and on to the outlet port 114 due to closure of the fluid replenishing valve 176.

Referring now to FIG. 3, the fluid replenishing valve 176, which may be normally closed, can be caused to open when the pressure of the brake fluid increases high enough to move the piston of the fluid replenishing valve 176 such that the fluid replenishing valve 176 opens. More specifically, the

| | Floating piston assembly 150 | Braking status | Replenishing Valve 176 | Pressure in inlet chamber 135 and central chamber 126 | Pressure in outlet chamber 136 | |
|---|---|---|---|---|---|---|
| 1 | At central base 124 | No braking | Closed | Very low | Residual pressure | |
| 2 | At end wall 128 | Not fully applied braking | Closed | Low | >Residual pressure | |
| 3 | At end wall 128 | Fully applied braking | Open | High | High | Inlet and outlet chambers communicate |
| 4 | At end wall 128 | No braking, keep disk running clearance | Closed | Low | >Residual pressure | |
| 5 | At central base 124 | No braking | Closed | Very low | Residual pressure | |

FIG. 2 shows the slack adjuster 110 according to a first operational condition. The operational state shown in FIG. 2 can correspond to scenario 2 in the table above. Namely, as shown by the arrows representing brake exemplary brake fluid flow, brake fluid under pressure can be provided to the inlet port 112 in response to initiation of a braking input (e.g., initiation of a brake pedal). The braking input may be such that the braking is not fully applied.

Initially, to reach the state shown in FIG. 2, the brake fluid can enter the inlet channel 130 and then into the center chamber portion 126. From the center chamber portion 126, the brake fluid can act on opposing working areas/surfaces 172 of the sensing piston assemblies 170 such that the sensing piston assembly 170 and the floating piston assembly 150 are pushed toward the outlet port 114 and eventually to the first position of the floating piston assembly 150, such as shown in FIG. 2. In embodiments where one or more channels 132 are provided, the brake fluid can also flow from the inlet channel 130 through the channel(s) 132 and fluid replenishing valve 176 can open due to hydraulic force of the brake fluid acting on the fluid replenishing valve 176 overcoming the mechanical force of the compressed spring(s) behind the sensing piston of the sensing piston assembly 170. Additionally, the hydraulic force needs to overcome the air force generated by dry air behind the piston of the sensing piston assembly 170 when air gets compressed. The brake fluid can then proceed from the chamber between the sensing piston assembly 170 and the floating piston assembly 150 through the passageway 154 in the floating piston assembly 150 to and through the outlet port 114 and on to the brake assembly 107. FIG. 3 can correspond to scenario 3 in the table above.

When the braking input is stopped (e.g., brake pedal released), the slack adjuster 110 can revert to the position shown in FIG. 2. Such state can correspond to scenario 4 in the table above. Here, the fluid replenishing valve 176 can be closed and the floating piston assembly 150 (and the sensing piston assembly 170) is in the first position, thereby trapping the volume of brake fluid from the slack adjuster 110 in the chamber of the brake assembly 107. FIG. 2 may also correspond to scenario 4 in the table above.

Referring now to FIG. 4, where there is no braking brake fluid from the braking assembly 107 can be provided to the outlet port 114 of the slack adjuster 110. Though this brake fluid can be under relatively high pressure (compared to the brake fluid in the inlet chamber 135 of the chamber portion 125), the pressure may not be sufficient to open the fluid replenishing valve 176. However, with the fluid replenishing valve 176 closed, the pressure can be sufficient to move the floating piston assembly 150 and the sensing piston assembly 170 inward toward the center base 124 to the second position of the floating piston assembly 150, such as shown in FIG. 4. The position shown in FIG. 4 can correspond to scenario 5 in the table above.

Brake fluid between the center base 124 and the floating piston assembly 150 and the sensing piston assembly 170 can be caused to flow back through the center chamber portion 126 and through the channels 132, if provided. The channels 132 can be implemented to accommodate sufficient return flow of the brake fluid in light of the particular flow area of the center chamber portion 126 to accommodate back flow of the brake fluid.

The spring 160 associated with the combined movement of the floating piston assembly 150 and the sensing piston assembly 170 can provide relatively less resistance to the brake fluid coming from the outlet port 114 as compared to the resistance provided by the spring of the fluid replenishing valve 176. Thus, with the brake input disengaged, the back pressure of the brake fluid on the brake side of the slack adjuster 110, produced by the service brake return springs, can keep the floating piston assembly 150 retracted.

In view of the foregoing, slack adjusters 110 according to embodiments of the disclosed subject matter may implement suitable volumetric displacement of brake fluid according to a compact length-wise profile. Hence, redesign and redevelopment of redesign and rebuild tube assemblies to interface with the outlet ports 114 of the slack adjuster 110 may not be necessary.

While aspects of the present disclosure have been particularly shown and described with reference to the embodiments above, it will be understood by those skilled in the art that various additional embodiments may be contemplated by the modification of the disclosed machines, assemblies, systems, and methods without departing from the spirit and scope of what is disclosed. Such embodiments should be understood to fall within the scope of the present disclosure as determined based upon the claims and any equivalents thereof.

The invention claimed is:

1. A multi-wheel braking system for a vehicle comprising:
a hydraulic fluid source adapted to control supply of hydraulic fluid responsive to a braking input; and
a dual slack adjuster having an inlet port to receive the hydraulic fluid from the hydraulic fluid source, a first outlet port to selectively pass the hydraulic fluid to control braking of a first wheel of the vehicle, and a second outlet port to selectively pass the hydraulic fluid to control braking of a second wheel of the vehicle, the dual slack adjuster including:
a base enclosure defining an internal chamber that extends along a longitudinal axis of the base enclosure, an inlet channel that extends from the inlet port along a transverse axis of the base enclosure perpendicular to the longitudinal axis, at least one first backflow channel that extends from the inlet channel in a first direction of the longitudinal axis, and at least one second backflow channel that extends from the inlet chap a second direction of the longitudinal axis opposite the first direction,
a first sensing piston assembly at a first outlet port side and a second sensing piston assembly at a second outlet port side, and
a first floating piston assembly at the first outlet port side and a second floating piston assembly at the second outlet port side,
wherein the internal chamber includes a first chamber portion at the first outlet port side, a second chamber portion at the second outlet port side, and a center chamber portion that intersects the inlet channel and intervenes between the first and second chamber portions,
wherein the first chamber portion accommodates the first floating piston assembly and the second chamber portion accommodates the second floating piston assembly such that each of the first and second floating piston assemblies is movable to each of a first position and a second position within the first and second chamber portions, respectively,
wherein in the first position of the first floating piston assembly the first sensing piston assembly is entirely in the first chamber portion and in the second position of the first floating piston assembly the first sensing piston assembly is partly in the center chamber portion,
wherein in the first position of the second floating piston assembly the second sensing piston assembly is entirely in the second chamber portion and in the second. position of the second floating piston assembly the second sensing piston assembly is partly in the center chamber portion,
wherein all portions of each of the at least one first backflow channel and all portions of each of the at least one second backflow channel remain in a same position relative to the base enclosure and the inlet channel when the first and second floating piston assemblies are respectively in each of the first and second positions,
wherein each of the at least one first backflow channel and each of the at least one second backflow channel are entirely distinct from the first chamber portion, the second chamber portion, and the center chamber portion of the internal chamber, and
wherein no portion of each of the at least one first backflow channel and the at least one second backflow channel extends along the longitudinal axis of the base enclosure.

2. The multi-wheel braking system according to claim 1, wherein the at least one first backflow channel includes one first backflow channel at a first side of the longitudinal axis closer to the inlet port and another first backflow channel at a second side of the longitudinal axis farther from the inlet port, and
wherein the at least one second backflow channel includesone second backflow channel at the first side of the longitudinal axis closer to the inlet port and another second backflow channel at the second side of the longitudinal axis farther from the inlet port.

3. The multi-wheel braking system according to claim 1, wherein the base enclosure includes:
a first end cap having the first outlet port,
a second end cap haying the second outlet port, and
a central base threadedly receiving each of the first end cap and the second end cap and having the inlet port, the inlet channel, the at least one first backflow channel, and the at least one second backflow channel.

4. The multi-wheel braking system according to claim 1, wherein a first spring biases a first piston of the first floating piston assembly toward the first outlet port, and wherein a second spring biases a second piston of the second floating piston assembly toward the second outlet port.

5. The multi-wheel braking system according to claim 1, wherein a first flow path for the hydraulic fluid is directly from the first chamber portion through the first sensing piston assembly, then through the first floating piston assembly to the first outlet port, and wherein a second flow path for the hydraulic fluid is directly from the second chamber portion through the second sensing piston assembly, then through the second floating piston assembly to the second outlet port.

6. The multi-wheel braking system according to claim 1, wherein a first piston of the first floating piston assembly extends to more than half of a first length of a first cage of the first sensing piston assembly, and wherein a second piston of the second floating piston assembly extends to more than half of a second length a second cage of the second sensing piston assembly.

7. A method comprising:
providing a dual slack adjuster assembly having an inlet port to receive brake fluid, a first outlet port to selectively pass the brake fluid, and a second outlet port to selectively pass the brake fluid; and
providing the brake fluid within the dual slack adjuster assembly,
wherein the dual slack adjuster assembly includes:
a base enclosure defining an internal chamber that extends along a longitudinal axis of the base enclosure and an inlet channel that extends from the inlet port along a transverse axis of the base enclosure perpendicular to the longitudinal axis, the internal chamber having a first chamber portion, a second chamber portion, a center chamber portion that intersects the inlet channel and is in fluid communication with the first and second chamber portions, a first backflow channel that extends from the inlet channel in a first direction of the longitudinal axis, and a second backflow channel that extends from the inlet channel in the direction of the longitudinal axis opposite the first direction, the first and second backflow channels being parallel to each other and spaced apart from each other in a direction of the transverse axis,
a pair of floating piston assemblies respectively slidingly provided in the f rst and second chamber portions, and
a pair of sensing piston assemblies respectively supported on the floating piston assemblies,
wherein said providing the brake fluid to the dual slack adjuster assembly causes each set of floating piston and sensing piston assemblies to respectively slide within the first and second chamber portions to one of a first position and a second position, and
wherein in the first position each of the sensing piston assemblies is entirely outside of the center chamber portion of the internal chamber.

8. The method according to claim 7, wherein in the second position each of the sensing piston assemblies extends into the center chamber portion of the internal chamber.

9. The method according to claim 7, wherein said providing the brake fluid includes, for each set of floating piston and sensing piston assemblies, causing the brake fluid to respectively flow directly from the first and second chamber portions through the sensing piston assemblies.

10. The method according to claim 7, wherein said providing the brake fluid includes, for each set of floating piston and sensing piston assemblies, causing the brake fluid to flow through the floating piston assemblies to the first and second outlet ports, respectively.

11. Previously Presented) The method according to claim 7,
wherein the dual slack adjuster assembly further includes a pair of the first backflow channels that extend from the inlet channel to the first and second chamber portions, respectively, and a pair of the second backflow channels that extend from the inlet channel to the first and second chamber portions, respectively, and
wherein said providing the brake fluid includes, for each set of floating piston and sensing piston assemblies, causing the brake fluid to respectively flow directly from the first and second chamber portions through the first and second backflow channels to the inlet channel.

12. The method according to claim 11, wherein said providing the brake fluid. includes, for each set of floating piston and sensing piston assemblies, causing the brake fluid to respectively flow from the first and second outlet ports to the first and second chamber portions.

13. A slack adjuster comprising:
a base enclosure defining an internal chamber that extends along a longitudinal axis of the base enclosure and an inlet channel that extends along a transverse axis of the base enclosure perpendicular to the longitudinal axis, the internal chamber having a first chamber portion, a second chamber portion, and a center chamber portion that intersects the inlet channel and is in fluid communication with the first and second chamber portions of the internal chamber;
a pair of floating piston assemblies respectively provided in the first and second chamber portions;
a pair of sensing piston assemblies respectively interfacing with the pair of floating piston assemblies in the first and second chamber portions; and
a pair of first channels that extend from the inlet channel to the first and second. chamber portions of the internal chamber, respectively, without passing through the sensing piston assemblies and the floating piston assemblies,
a pair of second channels, different from the pair of first channels, that extend from the inlet channel to the first and second chamber portions of the internal chamber. respective without passing through the sensing piston assemblies and the floating piston assemblies, each of the second channels being parallel to each of the first channels,
wherein the first and second chamber portions are sized in a direction of the longitudinal axis to respectively accommodate an entirety of the sensing piston assemblies without the sensing piston assemblies extending from the first and second chamber portions and into the center chamber portion of the internal chamber at least in a first position of each set of floating piston and sensing piston assemblies, and
wherein each of the first and second channels is entirely distinct from the first chamber portion, the second chamber portion, and the center chamber portion of the internal chamber.

14. The slack adjuster according to claim 13, wherein in the first position each of the floating piston assemblies abut respective endwalls of the first and second chamber portions.

15. The slack adjuster according to claim 13, wherein in the first position each of the sensing piston assemblies are entirely outside of the center chamber portion of the internal chamber.

16. The slack adjuster according to claim 13, wherein each of the first and second channels remains in a same position relative to the base enclosure when the first and second floating piston assemblies move to and from the first position.

17. The slack adjuster according to claim 13, wherein each set of the floating piston and the sensing piston assemblies is movable to a second position whereby a portion of the sensing piston assembly extends into the center chamber portion of the internal chamber.

18. The slack adjuster according to claim 13, further comprising a pair of springs that respectively bias corresponding sets of floating piston and sensing piston assemblies away from the transverse axis.

19. The slack adjuster according to claim 13, wherein the base enclosure includes:

a first end cap having a first outlet port, a second end cap having a second outlet port, and a central base having an inlet port, the inlet channel, and the pairs of first and second channels extending from the inlet channel.

20. The slack adjuster according to claim 13, wherein each of the first and second channels remains in a same position relative to the base enclosure and the inlet channel at all times.

* * * * *